Nov. 9, 1965                G. G. GLOVER                3,217,244
  MULTIPLE CONDUCTOR CABLE TESTER HAVING ROTATABLE ANNULAR SWITCH
       MEANS FOR TESTING INSULATION RESISTANCE, CROSS
                      WIRING AND CONTINUITY
Filed Dec. 27, 1961                              2 Sheets-Sheet 1

George G. Glover,
        INVENTOR.

BY  S. J. Rotondi
    A. T. Dupont
    D. H. Ward

Nov. 9, 1965 G. G. GLOVER 3,217,244
MULTIPLE CONDUCTOR CABLE TESTER HAVING ROTATABLE ANNULAR SWITCH
MEANS FOR TESTING INSULATION RESISTANCE, CROSS
WIRING AND CONTINUITY
Filed Dec. 27, 1961 2 Sheets-Sheet 2
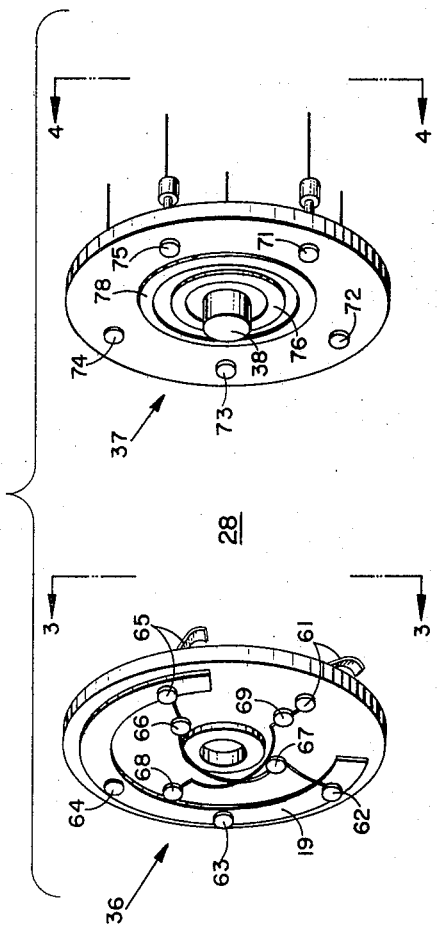
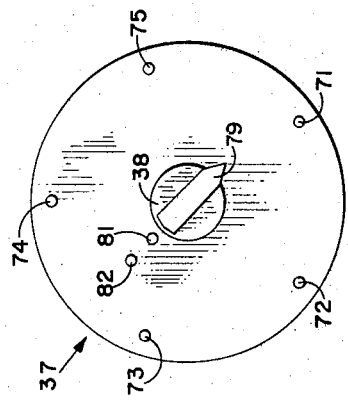
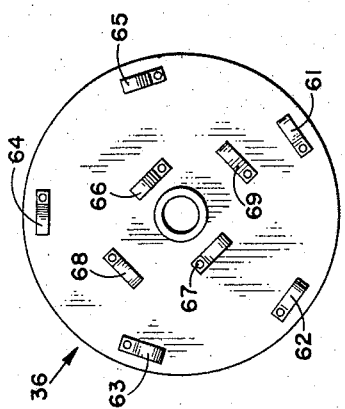
George G. Glover,
INVENTOR.
BY S. J. Rotondi
A. T. Dupont
D. H. Ward

United States Patent Office

3,217,244
Patented Nov. 9, 1965

3,217,244
MULTIPLE CONDUCTOR CABLE TESTER HAVING ROTATABLE ANNULAR SWITCH MEANS FOR TESTING INSULATION RESISTANCE, CROSS WIRING AND CONTINUITY
George G. Glover, Decatur, Ala., assignor to the United States of America as represented by the Secretary of the Army
Filed Dec. 27, 1961, Ser. No. 162,618
4 Claims. (Cl. 324—51)
(Granted under Title 35, U.S. Code (1952), sec. 266)

The invention described herein may be manufactured and used by or for the Government for governmental purposes without the payment of any royalty thereon.

This invention relates to electrical test instruments and more particularly to an instrument for testing the insulation resistance, cross wiring, and continuity of electrical cables.

The present method for checking insulation resistance of an electrical cable is accomplished by using a megohmmeter or as it is more commonly called, a "megger." This necessitates checking each conductor against the remaining conductors until all conductors have been individually checked. In addition, the use of a megger for checking cables in the field requires hand cranking the instrument. Thus, a field test of a 38 conductor cable would require hand cranking the megger to a rotational speed of 150 r.p.m. and at the same time moving the megger probes 1,367 times. The continuity and cross wiring test is made by an ohmmeter. The use of a megger and an ohmmeter for checking insulation resistance, continuity, and cross wiring is very time consuming and, therefore, not entirely satisfactory.

It is one object of this invention to provide a simple testing instrument to test for the insulation resistance, continuity and cross wiring of an electrical cable.

It is another object of this invention to provide a test instrument which minimizes the amount of time necessary to check for insulation resistance, continuity, and cross wiring.

It is a further object of this invention to provide a portable cable tester for use in the field that does not require the use of an external power source.

According to the present invention, the foregoing and other objects are attained by providing a device for testing insulation resistance, continuity, and cross wiring of an electrical cable. This device comprises a terminal jack for conecting the cable under test to an annular switching means, which in turn is removably connected by a double pole, double throw switch to either a first circuit for indicating insulation resistance or to a second circuit for indicating continuity and cross wiring. A test adapter is connected to the free end of the cable under test when the cable tester is being used to check for continuity and cross wiring.

The invention will be more fully understood through the following detailed description taken in conjunction with the accompanying drawing wherein:

FIGURE 2 is a perspective exploded view of an annular switch used in this invention.

FIGURE 3 is a view along line 3—3 of FIGURE 2.

FIGURE 4 is a view along line 4—4 of FIGURE 2.

Figure 1:
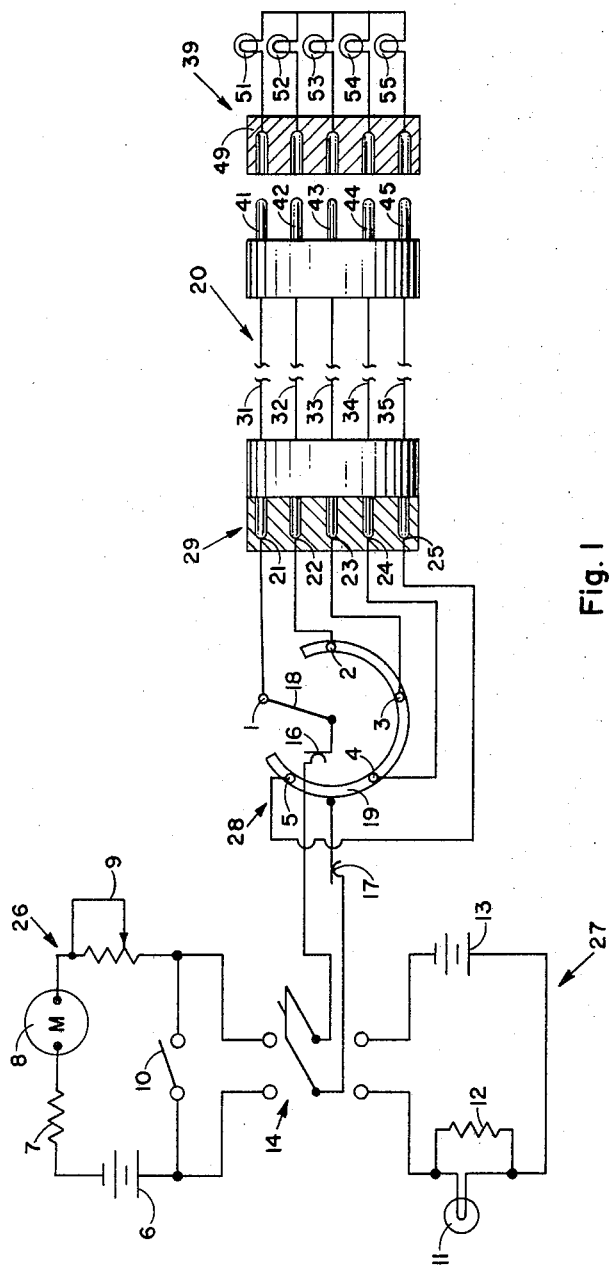
FIGURE 1 is a schematic diagram showing an embodiment of the invention.

A cable 20 to be tested for insulation resistance, continuity and cross wiring is shown connected to a terminal jack 29. This cable is shown to be a five conductor cable for reasons of clarity. In reality, the cable could have twenty-eight conductors, thirty-eight conductors, or any desired number of conductors. Obviously, if a thirty-eight conductor cable would require a terminal jack having thirty-eight terminals and other associated parts would also require a like number of contacts, terminals, etc. A rotatable annular switch 28 consists of an indicator 18 which can be turned to either of the five positions shown by contacts 1, 2, 3, 4 and 5. When the indicator is in the position shown contacts 2, 3, 4, 5 are electrically connected by a metal ring 19 which rotates with indicator 18. If indicator 18 was turned to contact 2, then contacts 1, 3, 4, 5 would be shorted together by metal ring 19. In a like manner the contacts not in contact with rotatable indicator 18 are always shorted together by metal ring 19. Contacts 1, 2, 3, 4, 5 are further shown to be electrically connected to terminals 21, 22, 23, 24, 25 respectively of terminal jack 29. Two conductors connect indicator 18 and ring 19 through a plurality of spring type contacts indicated by numerals 16 and 17, respectively to a double pole, double throw switch 14. One position of switch 14 connects an insulation resistance circuit 26 to said annular switch for indicating the insulation resistance of the cable while the other position of switch 14 connects a continuity and cross wiring indicating circuit 27 and simultaneously disconnects indicating circuit 26. A test adapter 39 used in conjunction with the continuity and cross wiring test is connected to the other end of cable 20 when this latter test is being made.

Insulation resistance circuit 26 comprises a power source 6 having a 500 volt D.C. battery connected in series with a 16 megohm resistor 7, a 30 microamp meter 8, and an adjustable 3.5 megohm resister 9. A calibration switch 10 is connected in parallel across serially connected battery 6, resistors 7 and 9 and meter 8. The microamp meter is calibrated in megohms (0–1000) by closing switch 10 and adjusting resistor 9 until a full scale reading of the meter corresponds to zero ohms. To illustrate the operation of this circuit it is assumed that there is an insulation breakdown between conductors 31 and 32. With switch 14 connected to circuit 26 and indicator 18 contacting contact 1 current flows from circuit 26, through the conductor leading to contact 16, through indicator 18 and the conductor leading to terminal 21 which is connected to conductor 31. The insulation breakdown between conductors 31 and 32 results in a lower resistance between the two conductors and a return current flow through conductor 32, to terminal 22, through metal ring 19 to contact 17 and back to circuit 26. The amount of resistance will be shown on meter 8.

The cross wiring and continuity circuit 27 comprises a power source 13 having a six volt D.C. battery which is connected in series with a parallel circuit consisting of a 5 ohm shunt resistor 12 and a lamp 11 having a 40 ohm resistance. The test adapter 39 which is connected to the free end of cable 20 when the cross wiring and continuity check is being made, consists of five lamps 51, 52, 53, 54, 55 (each one being the same as lamp 11) connected through a terminal jack 49 to pins 41, 42, 43, 44, 45, respectively.

To illustrate the operation of the continuity and cross wiring circuit, it is first assumed that cable 20 is in satisfactory condition. With switch 14 connected to circuit 27, test adapter connected to the free end of cable 20, and indicator 18 contacting contact 1, current will flow out of circuit 27 through contact 16, through indicator 18 to contact 1, through the conductor leading to terminal 21, through conductor 31 to lamp 51. On the return path, current will flow through lamps 52, 53, 54, 55, through conductors 32, 33, 34, 35 to terminals 22, 23, 24, 25, through the conductors leading to contacts 2, 3, 4, 5 which are shorted by ring 19, through contact 17 and back to circuit 27. During this test lamp 51 will light to indicate continuity. Note that lamps 52, 53, 54, 55 have only a negligible amount of current flow through them as compared to lamp 51. The values of the circuit components are such that the lower current flow through lamps 52, 53, 54, 55 is insufficient to light these lamps. In addition, lamp 11, which indicates shorts, will not light due to the low current flow through shunt resistor 12. Next, it is assumed that a short exists between conductor 31 and 32. In this case current will flow from circuit 27 to conductor 31 across to conductor 32 and back to circuit 27. The current flow through resistor 12 will produce a voltage drop sufficient to light lamp 11 indicating a short between conductor 31 and some other conductor; in this case conductor 32. By switching indicator 18 to contact 2, lamp 11 will again light indicating that the short exists between 31 and 32. Thirdly, it is assumed that cross wiring exists within cable 20. Suppose that within cable 20 the conductor from pin 44 is wired incorrectly and terminates at the pin inserted in terminal 21 instead of the pin terminating at terminal 24 and hence the conductor from pin 41 will terminate at terminal 24. The current flow would now be from contact 1 to terminal 21, to pin 44 and through lamp 54 which would light up. The light at lamp 54 would indicate cross wiring since the indicator is in position 1. With indicator 18 in position 4 current will flow through lamp 51 and verify the cross wiring indicated by light 54.

FIGURE 2 shows a more detailed view of the annular switch 28 which comprises a rotatable front plate 36 and a fixed rear plate 37. The plates are concentrically mounted on a central shaft 38 which extends through plate 37 and is secured to plate 36 to provide rotation thereto. The outside surface of plate 36 has three concentric rings of contacts. Each of these contacts extends through plate 36 and terminates as a spring-type contact on the inside surface of plate 36. An inner ring has two contacts 66 and 67, a central ring also has two contacts 68 and 69 and an outer ring has five contacts 61, 62, 63, 64, 65. All the spring-type contacts shown on the inner surface of plate 36 (FIGURE 3) are insulated from each other. However, on the outside surface of plate 36 contacts 68 and 69 are connected as are contacts 66 and 67. A further connection is made between contacts 69 and 61. The remaining contacts 62, 63, 64, 65 on the outside surface of plate 36 are connected together by an annular metal bar 19 which is electrically connected to contact 66 and 67. The inside surface of rear plate 37 also has three concentric contact rings corresponding to and in engagement with those of plate 36. The inner and central rings 76 and 78 respectively are each made of a continuous metal ring. The outside ring consists of flat contacts 71, 72, 73, 74, 75 which are insulated from each other. Shaft 38 is shown extending freely through plate 37 for attachment to plate 36.

FIGURE 3 shows the relative positioning of the spring-type contacts on the inside surface of plate 36 as previously described in relation to FIGURE 2.

FIGURE 4 shows contacts 71, 72, 73, 74, 75 extending through and terminating on the outside surface of plate 37 for connection to the cable under test. An indicating knob 79 is shown secured to the end of shaft 38. Terminals 81 and 82, which are shown on the outside surface of plate 37, extend through and connect respectively with rings 76 and 78 shown in FIGURE 2.

To illustrate the operation of switch 28 it is assumed that it is in the position shown by FIGURE 2. Current flow from switch 14 would enter and leave switch 28 by terminals 82 and 81 which are positioned on plate 37 as shown by FIGURE 4, respectively. Current entering at terminal 82 would flow through ring 78 which in turn is contacted by spring-type contacts 68 and 69. Contact 69 is connected to insulated contact 61 and current would flow through contact 61 to 71 and out 71 to one of the conductors of the cable under test. Assuming continuity exists current would return to switch 28 through the remaining conductors of the cable under test and terminate at contacts 72, 73, 74, 75. These contacts connect through spring-type contacts 62, 63, 64, 65 to the metal ring 19 which in turn connects to contacts 66 and 67 as shown in FIGURE 2. The current then flows through contacts 66 and 67 to continuous ring 76 which is connected to terminal 81 on the outside surface of rear plate 37 to complete the path of current flow through switch 28.

Although this invention has been illustrated as embodied in a specific form with regard to the values of the various circuit components, it should be understod that this is for purposes of illustration only and that the scope of the invention is not to be limited by this specific form but only by the appended claims.

I claim:

1. A device to test for insulation resistance, continuity and cross wiring of an electrical cable having a plurality of conductors, comprising a rotatable annular switching means having a plurality of contacts equal in number and adapted to be electrically connected to said conductors at one end of said cable when said cable is under test; said annular switching means having rotating means adapted to be rotated with respect to said contacts; said rotating means being so constructed as to selectively connect any one of said contacts to an indicating arm while connecting all other contacts to a shunt arm; a first and second circuit means, each having a power source, input terminals, and an indicating means; a double pole, double throw switch having a common pair of terminals connected between said indicating arm and said shunt arm respectively and having first and second pair of terminals selectively engaging said common pair of terminals in a first and a second position of said switch; said first pair of terminals being connected to the input terminals of said first circuit means for connecting said first circuit means to said annular switching means in the first position of said switch; said second pair of terminals being connected to the input terminals of said second circuit means for connecting said second circuit means to said annular switching means in the second position of said switch; a test adapter means having indicating means; said test adapter being disposed for connecting said plurality of conductors at the other end of said cable in shunt; said test adapter means connecting said conductor in shunt when said switch is in the second position; said first circuit means providing an indication of the insulation resistance of said cable when said switch is in the first position; and said second indicating means of said circuit means and said test adapter means providing an indication of the continuity and cross wiring of said cable when said switch is in the second position.

2. A device as set forth in claim 1 wherein said first circuit means comprises a series having a power source for supplying current and voltage to said cable to test for insulation resistance, a fixed resistor for limiting current flow, an ammeter for indicating insulation resistance, its input terminals for connection to the cable, and an adjustable resistor for calibrating said ammeter; and a calibration switch connected in parallel with said series circuit to provide a complete path for current flow when calibrating said ammeter.

3. A device as set forth in claim 1 wherein said second circuit means comprises a series circuit of its power source, input terminals, and indicating means; and wherein said indicating means comprises a relative low resistance means shunting a lamp which indicates short circuits in said cable.

4. A device as set forth in claim 1 wherein said test adapter means comprises a terminal jack having a plurality of contacts equal in number and electrically connected to said conductors at the other end of said cable, and wherein the indicating means of said test adapter means comprises a plurality of lamps for indicating continuity and cross wiring in the conductors of said cable, each of said lamps having one side connected to one of said terminal contacts, and the other side of said lamps being connected to a common conductor.

References Cited by the Examiner

UNITED STATES PATENTS

| | | | |
|---|---|---|---|
| 1,738,710 | 12/29 | Jones | 324—66 |
| 1,977,707 | 10/34 | Weitzer | 324—73 X |
| 2,635,135 | 4/53 | Lamont | 324—52 X |
| 3,141,128 | 7/64 | Behr | 324—51 |

FREDERICK M. STRADER, *Primary Examiner.*

WALTER L. CARLSON, *Examiner.*